United States Patent [19]

Shimabukuro

[11] 3,927,164

[45] Dec. 16, 1975

[54] METHOD FOR TURNING A FLEXIBLE TUBE INSIDE OUT

[76] Inventor: Seiki Shimabukuro, c/o Ashimori Kogyo Kabushiki Kaisha, No. 15, 4-chome, Yokobori, Higashiku, Osaka, Osaka, Japan

[22] Filed: July 25, 1973

[21] Appl. No.: 382,366

[30] Foreign Application Priority Data

July 25, 1972 Japan.............................. 47-74341

[52] U.S. Cl. ...................... 264/95; 117/66; 117/95; 156/247; 156/287; 156/294; 264/134; 264/295
[51] Int. Cl.² ..................... B29C 17/00; B29C 17/02
[58] Field of Search ........... 264/88, 89, 32, 95, 209, 264/269, 314, 285, 339, 224, 137, 295, 93, 94, 134; 425/387, 59, 404; 93/77, 82, 83; 156/294, 247, 287; 117/66, 95

[56] References Cited
UNITED STATES PATENTS

| | | | |
|---|---|---|---|
| 2,013,684 | 9/1935 | Capella-Dalmau | 264/88 |
| 2,713,885 | 7/1955 | McKinley | 156/294 |
| 2,794,758 | 6/1957 | Harper et al. | 156/294 |
| 3,132,062 | 5/1964 | Lang et al. | 156/287 |
| 3,230,129 | 1/1966 | Kelly | 156/294 |
| 3,494,813 | 2/1970 | Lawrence et al. | 156/294 |

FOREIGN PATENTS OR APPLICATIONS

| | | | |
|---|---|---|---|
| 957,929 | 5/1964 | United Kingdom | 264/295 |

*Primary Examiner*—Jeffery R. Thurlow
*Attorney, Agent, or Firm*—Stewart and Kolasch, Ltd.

[57] ABSTRACT

A method for turning a flexible tube inside out which comprises the steps of turning a flexible tube inside out at its one terminal end, fixing the terminal end having been turned inside out, inflating the flexible tube to almost a circular shape in cross section at the turning point where the tube is turned inside out and at that portion extending from said turning point to said fixed terminal end having already been turned inside out, while squeezing the unturned successive portion of the flexible tube extending from said turning point to the other terminal end while producing a twist in said unturned successive portion to aid in the turning inside out of said tube. The portion which has been turned inside out and the unturned portion of the flexible tube is permitted to move along an axis extending outward from the fixed terminal end, thereby continuously shifting the turning point from the fixed terminal end to the other terminal end over the full length of the tube. The present method is effectuated by applying fluid pressure internally to a confined chamber containing the flexible tube, said chamber being provided with a means for withdrawing one terminal end of the tube from the chamber.

9 Claims, 2 Drawing Figures

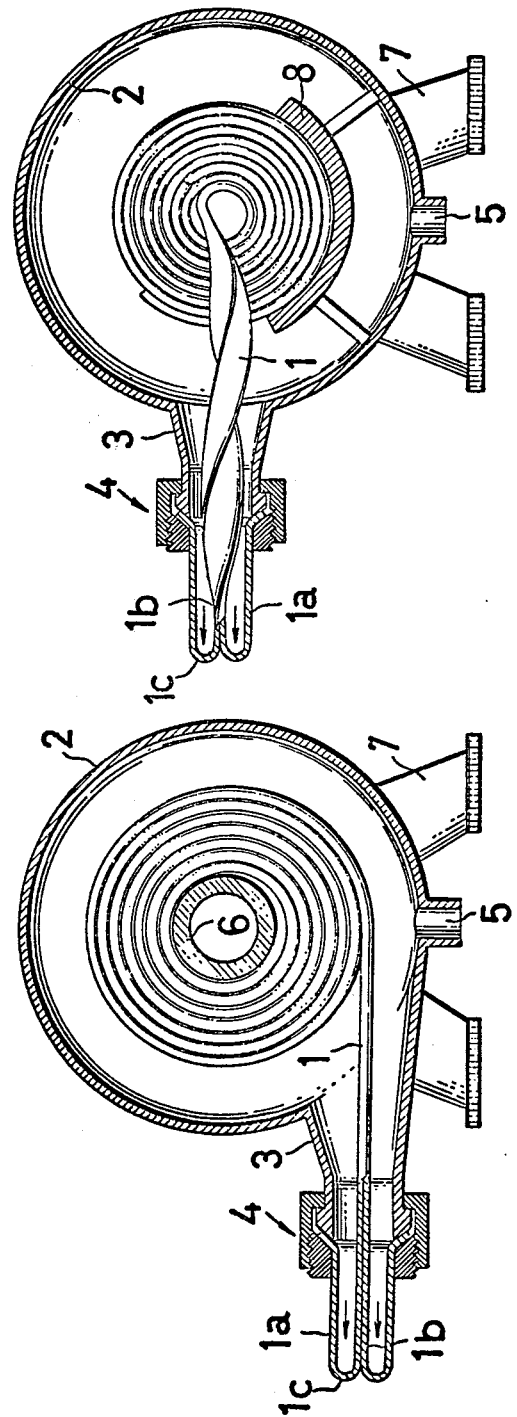

METHOD FOR TURNING A FLEXIBLE TUBE INSIDE OUT

BACKGROUND OF THE INVENTION

The present invention relates to a method of turning a flexible tube inside out. More particularly, the present invention relates to a method for turning a flexible tube inside out (evaginating), said tube having been manufactured to purposely have reversed inner and outer surfaces for convenience of manufacturing conditions.

In the manufacture of hoses such as a fire hose, it is known to coat the external surface of a textile jacket made of woven or knitted fibers in a tubular form with a film of a rubber or a synthetic resin and then to turn the externally coated jacket inside out to produce a hose with a lining of said rubber or synthetic resin. For example, British Patent No. 957,929 discloses a process for manufacturing a fire hose by inserting a hollow mandrel into an externally coated flexible tubular jacket, turning one end thereof into the mandrel and drawing the turned in end of the jacket through the mandrel by means of a wire whereby the externally coated jacket is evaginated over the full length thereof. However, in this process wherein the flexible tubular jacket is brought into contact with the hollow mandrel over its entire length, a considerable force is required to smoothly draw the jacket which is in contact with the mandrel. In this case, the jacket is desirably thin and flexible as it is turned in over a nose provided at the terminal end of the hollow mandrel and drawn therethrough. If the jacket contains a certain amount of stiffness, friction will be created between the turned portion and the unturned portion at said nose which will disturb the smooth turning of the jacket. Once the running jacket is obstructed, forced drawing of the jacket will cause cracks, punctures or similar problems. Accordingly, the process of said British patent is only operable when using an extremely thin flexible tubular jacket and a strong drawing force. Also, there are additional problems in the process of the British patent in that the hollow mandrel should have approximately the same length as the flexible tubular jacket to be turned inside out and should be sufficiently strong to withstand the strong drawing force while being supported at only its one terminal end. Additionally, a number of different size mandrels must be available since the diameter of the mandrel used will vary as that of the flexible tubular jacket. It is therefore difficult to prepare many different types of long, heavy, strong mandrels and to be required to change them frequently depending on the size of the flexible tube to be turned inside out. Accordingly, there is a large demand for the development of an improved method for smoothly turning a flexible tube inside out without which eliminates the above prior art problems.

BRIEF SUMMARY OF THE INVENTION

Accordingly, it is an object of the present invention to provide an improved method for smoothly turning a flexible tube inside out utilizing a weak drawing force.

Another object of the present invention is to provide an economical method for turning a flexible tube inside out without encountering the problems found in the prior art.

Still another object of the present invention is to provide a flexible tube with a lining of a rubber or a synthetic resin having an even thickness and being substantially free of imperfections.

A further object of the present invention is to provide a new apparatus for smoothly turning a flexible tube inside out wherein a fluid pressure is utilized as force for evagination.

These and other objects and advantages of the present invention will become apparent to those skilled in the art from a consideration of the following specification and claims, taken in conjunction with the accompanying drawings.

BRIEF DESCRIPTION OF THE DRAWINGS

The preferred embodiments of the present invention are shown in the accompanying drawings which are not to be considered as being limitative and wherein;

FIG. 1 is a sectional view of a pressure apparatus for carrying out evagination of a flexible tube externally coated with a film of rubber or a synthetic resin of even thickness;

FIG. 2 is a sectional view of another further improved embodiment of the apparatus of FIG. 1;

DETAILED DESCRIPTION OF THE INVENTION

In accordance with the present invention, there is provided a method for turning a flexible tube inside out which comprises the steps of turning a flexible tube inside out at its one terminal end, fixing the terminal end having been turned inside out, inflating the flexible tube to almost a circular shape in its cross section at the turning point where the tube is turned inside out and at that portion extending from said turning point to said fixed terminal end having already been turned inside out while squeezing the unturned successive portion of the flexible tube extending from said turning point to the other terminal end. The portion which has been turned inside out and the unturned portion of the flexible tube is permitted to move along an axis extending outward from the fixed terminal end, thereby continuously shifting the turning point from the fixed terminal end to the other terminal end over the full length of the tube.

In the case where a flexible tube is evaginated, the turning position, where a portion of the tube having been evaginated and a portion of the tube not yet evaginated are in contact with each other, should be set in the neighborhood of one terminal end thereof. Since the evaginated portion and the unevaginated portion of the tube are each equal in their diameters, either one of the portions can be forcedly inserted into the other. Thus, the portion inserted inside will inevitably form wrinkles and possess a wavy peripheral wall. At the turning point, the portion having a smooth wall is connected at a very short distance to the portion having a wavy wall, thus creating an unnatural distortional state. If the turning point in said state is shifted, some friction will be produced between said two portions to cause obstruction to evagination.

According to the method of the present invention, shifting of the turning point can be smoothly achieved without damaging the external rubber or synthetic resin coating by inflating the tube at the turning point and in its portion previously turned inside out (i.e., an outer portion) while squeezing a subsequent portion not yet turned inside out (i.e., an inner portion). In this case, the space between the evaginated outer tube and the unevaginated inner tube is enlarged and the externally coated inner tube having a wrinkled and wavy wall can be turned inside out very smoothly at a certain extended distance to form a roundly inflated outer tube with the desired lining.

In accordance with one embodiment of the present invention, fluid pressure is utilized for inflating the tube at the turning point and in the previously evaginated portion while squeezing the tube in a subsequent unevaginated portion. In this case, a flexible tube usually arranged in a coiled condition is placed in a confined pressure container and one terminal end of the tube is fixed to the container, while the other terminal end is allowed to extend outside of the container through a nozzle provided therein. A portion of the tube extending outside of the container is evaginated and the terminal end is fixed onto the external surface of the nozzle. A fluid such as air or a liquid such as water is introduced into the container under pressure whereby the tube is inflated at the turning point and in the previous evagainated portion while the tube in the subsequent unevaginated portion is squeezed or compressed. By maintaining an adequate inner pressure, the tube squeezed in the container is gradually unwound and is directed toward the nozzle whereby the turning point is shifted from the terminal end evaginated outside the nozzle to the other terminal end over the full length of the tube. Accordingly, the fluid pressure functions not only for inflating and simultaneous squeezing the tube but also as a propellant for extruding the squeezed tube from the nozzle whereby evagination is automatically attained.

Since, in the above-mentioned embodiment, evagination of the tube cannot be effected smoothly if it is made of a relatively stiff material or has a relatively small diameter, according to a further improved embodiment of the present invention, the squeezed tube is reeled off in a twisted condition whereby the tube becomes smaller in its size and easily passes through the inside of the evaginated tube with a negligible frictional resistance. In this embodiment the tube is reeled off from the terminal end near the core of the coiled tube.

The flexible tube may be made of any of the fibrous materials which are woven or knitted in a tubular form and externally coated with a film of natural or synthetic rubber of a synthetic resin. The flexible tube may also be a water permeable or impermeable plastic resinous material shaped into a tubular form and coated with a different type of water impermeable resin. Preferred fibrous materials are natural and synthetic organic fibers and inorganic fibers such as cotton, linene, glass, regenerated cellulose, polyamides, polyesters, and the like.

This invention will now be described in more detail with reference to the accompanying drawings.

FIG. 1 shows a pressure apparatus for turning flexible tubes inside out, including a flexible tube 1 having an evaginated portion 1a, an unevaginated portion 1b and a portion 1c at the turning point. A pressure container 2 supported by legs 7 has a nozzle 3 fixed to the container 2 and may be closed tightly with a cover (not shown). The nozzle 3 is provided at its pointed end with a metal fastener 4 which functions to fix the evaginated terminal end of the flexible tube 1. The container 2 is provided, for example, at its bottom portion, with an inlet 5 through which a fluid can be introduced under pressure by means of a pump (not shown). A shaft 6 is mounted to the inner wall of the container 2.

A flexible tube 1 wound into a coil is disposed on the shaft 6 in the pressure container 2 and an outer terminal end of the tube 1 is drawn and passed through the nozzle 3 from the interior of the container 2. The terminal end of the tube 1 is then turned inside out and secured to the metal fastener 4. The pressure container 2 is then closed tightly and a fluid is introduced into said container through the inlet 5. Water is most suited as the pressure fluid. As the fluid is pumped into the container, the portion 1c and the already evaginated portion 1a are inflated to a round shape by the inner pressure of the fluid while the unevaginated portion 1b is maintained in a floating condition. The portion 1c at the turning point is inflated internally by the fluid pressure and then turned inside out to form the evaginated portion 1a with the simultaneous and continuous forward movement of the portion 1b toward the turning point. Accordingly, the portion 1b changes at the turning point to portion 1c which is then evaginated to form portion 1a. The tube in the pressure container 2 is continuously removed from the reel and allowed to move through the nozzle 3 toward the turning point where the tube is turned inside out. Since the portion 1c and the evaginated portion 1a are inflated to a round shape by the internal fluid pressure and since the unevaginated portion 1b is maintained in a squeezed state by the fluid pressure, the flexible tube 1 can be turned inside out smoothly without any difficulty. Where the unevaginated portion 1b is passed through the inside of the evaginated portion 1a, some friction is produced between the inner surface of the portion 1a and the outer surface of the portion 1b. However, the pressurizing fluid functions as a lubricant which substantially reduces the friction. It should be noted that the use of the apparatus of this type is not suitable when the material of the tube is relatively stiff or the diameter of the tube is relatively small, for example, as small as about 1 inch. In such a case, the friction between the portions 1a and 1b is substantial and thus evagination cannot be achieved unless an extremely high pressure is applied to the apparatus. This is due to the fact that portion 1b passing through the portion 1a internally inflated to a cylindrical form is maintained in a flattened condition and the folded edge portions thereof lose their flexibility and resist evagination at the turning point.

FIG. 2 shows an inproved variant of the apparatus of FIG. 1. The flexible tube 1, which is wound into a coil, is placed on a table 8 in the pressure container 2. The table 8 is preferably curved circularly as shown in the drawing to stabilize the tube against rolling. The tube is drawn from the core of the coil, passed through nozzle 3 and then treated as explained with reference to FIG. 1. According to this improved embodiment, the tube is drawn from the central portion of the tube coil without permitting any rotation of the coil, thereby maintaining the tube in a twisted state as shown in the drawing. When a tube in the flattened state is twisted, the flattened tube will curl in its cross section so as to depict a C-shape and, in an extreme case, the folded edge portions of the flattened tube will become adjacent to each other and form almost a circular shape in cross section. Thus, the size of the portion 1b is smaller and thus readily passes through the evaginated portion 1a without any substantial amount of frictional resistance. In actual operation, using the apparatus of FIG. 2, a hose having a ¾ inch diameter is easily turned inside out by an application of pressure of about 5 kg./cm$^2$ or less, whereas the same hose could not be turned inside out in a similar operation using the apparatus of FIG. 1, even by using a pressure of 8 kg./cm$^2$ or more. When using a tube having a diameter of at least 2 inches, either of the apparatus of FIG. 1 and 2 may be employed. However, when the apparatus of FIG. 1 is employed, it is preferred to use a guide assembly for curving the flattened tube to a U-shape or C-shape in its cross section prior to passing the tube through the evaginated portion 1a, thereby effectively minimizing the frictional resistance.

The pressure apparatus of FIG. 1 or FIG. 2 may have a plurality of nozzles to enable the evagination treatment to be conducted on several tubes at one time. In any case, the terminal end of the tube 1 placed in the pressure container 2 has to be closed very tightly. If several tubes are treated at one time, they will not be evaginated at the same time and the one most susceptible to evagination will first be evaginated. If the terminal end of the tube in the pressure apparatus has not been sufficiently closed, the pressurizing fluid in the pressure container will be violently projected through the hollow evaginated tube, thus making it impossible to continue the evagination treatment for the remaining tubes. Closing of the terminal end of the tube placed in the pressure container is particularly recommended when the above embodiment of the present invention is adopted for manufacturing a hose by evaginating an externally coated tubular textile jacket. The pressure test and pinhole detecting test of such hose can be made at one time in the same pressure container after manufacture of the hose.

The method of the present invention is featured by inflating the flexible tube at its turning point and where it has been evaginated while squeezing the unevaginated portion of the tube through the application of internal fluid pressure. Thus, passing of the unevaginated portion through the evaginated portion becomes easier and evagination of the tube proceeds smoothly at the turning point, requiring only a relatively weak drawing or extruding force.

In the case of using the pressure container of FIGS. 1 or 2, the pressure container must be able to tolerate a high internal pressure and can be used for treating, at one time, one or more flexible tubes of various diameters from about ½ inch to about 5 inches. A tube of any different size can be treated in the same pressure container by merely exchanging the nozzle according to the size of the tube to be treated. This present process brings about a great economical advantage in the hose manufacturing industry.

The method of the present invention is particularly useful as a step for evaginating an externally coated tubular textile jacket in a method for manufacturing a hose for high pressure liquids, for example a fire hose. This is achieved by forming a coating of rubber or a synthetic resin on the external surface of a tubular textile jacket and turning it inside out. Thus, the method of the present invention is generally applicable for manufacturing a tubular material with a lining having an even thickness and being free from any imperfections by the evagination technique applied to an externally coated tubular material.

The invention being thus described, it will be obvious that the same may be varied in many ways. Such variations are not to be regarded as a departure from the spirit and scope of the invention, but all such modifications are intended to be included within the scope of the following claims.

What is claimed is:

1. A method of manufacturing a flexible tube provided with an inner lining having a uniform thickness substantially free of imperfections which comprises applying a coating to the external surface of the flexible tube, placing the flexible tube which has been wound into a coil and which has one closed terminal end thereof into a confined chamber containing an exhaust nozzle, drawing out said other terminal end from the core of the coiled flexible tube without permitting any rotation of the coil, thereby inherently producing a twist in the flexible tube, turning the end portion of said other terminal end of the flexible tube inside out and fixing said other terminal end portion having been turned inside out to said exhaust nozzle, introducing a pressurizing fluid into said confined chamber, thereby inflating and evaginating the flexible tube to an almost circular cross-sectional shape as it is propelled from the chamber, while at the same time compressing that portion of the flexible tube still remaining unevaginated said evaginated portion and said unevaginated portion being separated by a turning point which continually shift from the fixed terminal end to its closed terminal end over the entire length of the flexible tube, wherein the drawing of the flexible tube through the exhaust nozzle in a twisted state reduces the size of the flexible tube which in turn reduces the frictional resistance of the flexible tube as it passes through the inside of the evaginated tube and as it is evaginated through the exhaust nozzle.

2. The method of claim 1, wherein the pressurizing fluid is water.

3. The method of claim 1, wherein the coating is a resinous synthetic material.

4. The method of claim 3, wherein the flexible tube is made of woven or knitted natural, synthetic and inorganic fibers selected from the group consisting of cotton, linen, glass, regenerated cellulose, polyamides and polyesters.

5. The method of claim 4, wherein the coated flexible tube is a fire hose.

6. The method of claim 1, wherein when the flexible tube is in the coiled state, the closed terminal end is at the periphery of the coil and the evaginated terminal end is drawn from the core of the coil.

7. The method of claim 1, wherein flexible tubes having a diameter of about 0.5 inch to 5 inches are evaginated utilizing a pressurized fluid having a pressure of about 5 kg/cm$^2$ or less.

8. The method of claim 1, wherein the twist in the flexible tube has a U-shape or a C-shape in its cross-section prior to being passed through the exhaust nozzle.

9. A method of manufacturing a flexible tube provided with an inner lining having a uniform thickness substantially free of imperfections which comprises applying a coating to the external surface of the flexible tube, placing the flexible tube which has been wound into a coil and which has one closed terminal end thereof in a confined chamber containing an exhaust nozzle, drawing out said other terminal end from the periphery of the coiled flexible tube, twisting the flattened flexible tube to a U-shape or a C-shape in its cross-section as it is drawn from the periphery of the coiled flexible tube, turning the end portion of said other terminal end of the flexible tube inside out and fixing said other terminal end portion having been turned inside out to said exhaust nozzle, introducing a pressurizing fluid into said confining chamber, thereby inflating and evaginating the flexible tube to an almost circular cross-sectional shape as it is propelled from the chamber while at the same time compressing that portion of the flexible tube still remaining unevaginated, said evaginated portion and said unevaginated portion being separated by a turning point which continually shifts from the fixed terminal end to its closed terminal end over the full length of the flexible tube, wherein the drawing of the flexible tube through the exhaust nozzle in a twisted state reduces the size of the flexible tube which in turn reduces the frictional resistance of the flexible tube as it passes through the inside of the evaginated tube and as it is evaginated through the exhaust nozzle.

* * * * *